No. 81,751. J. B. CASSEL. LARD PRESS AND SAUSAGE STUFFER. PATENTED SEPT. 1, 1868.
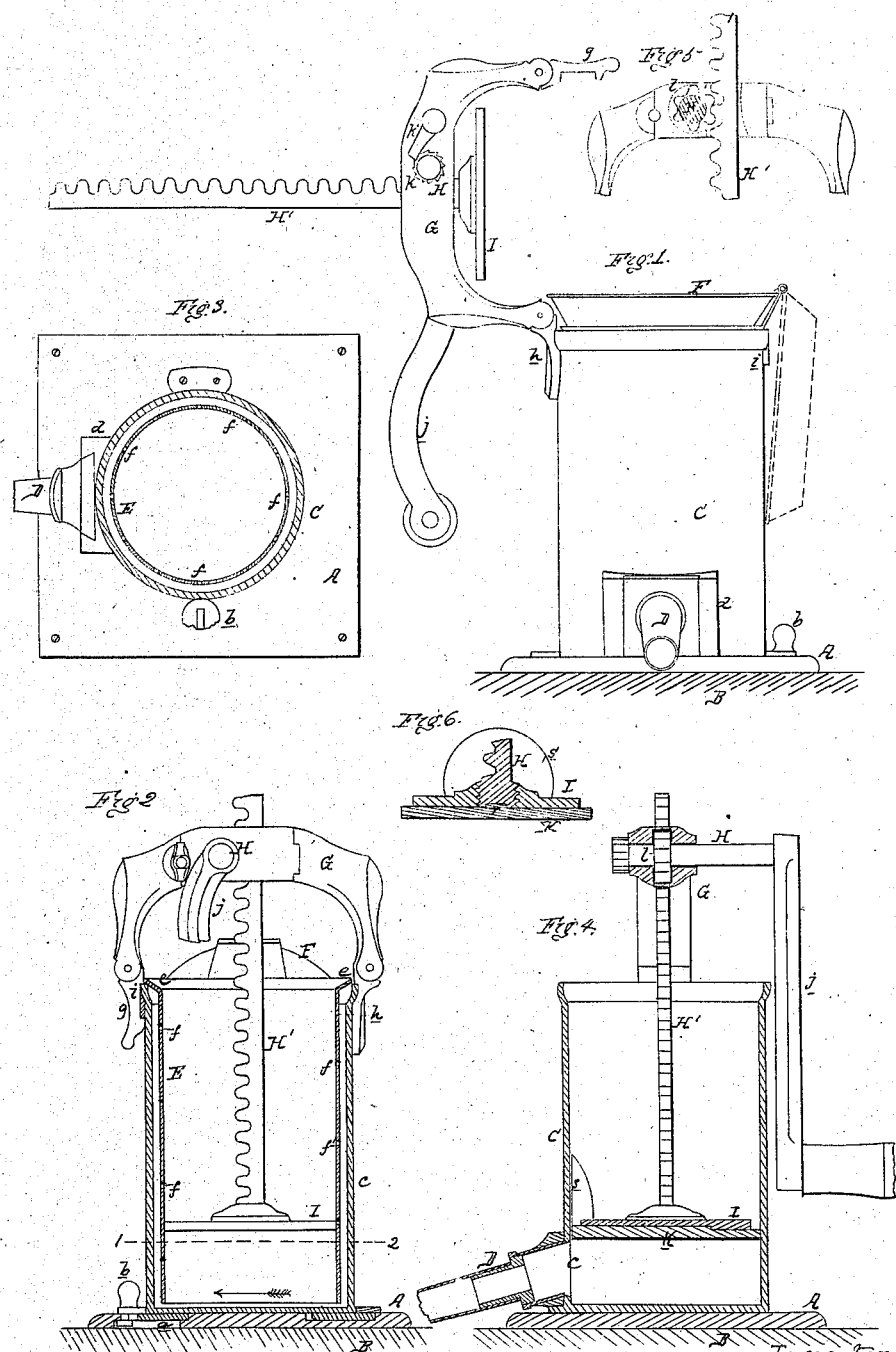

United States Patent Office.

JOSEPH B. CASSEL, OF WORCESTER TOWNSHIP, PENNSYLVANIA.

*Letters Patent No. 81,751; dated September 1, 1868.*

IMPROVED LARD-PRESS AND SAUSAGE-STUFFER.

*The Schedule referred to in these Letters Patent and making part of the same.*

TO ALL WHOM IT MAY CONCERN:

Be it known that I, JOSEPH B. CASSEL, of Worcester township, Montgomery county, Pennsylvania, have invented a Combined Lard-Press and Sausage-Stuffer; and I do hereby declare the following to be a full, clear, and exact description of the same.

My invention consists of a cylindrical vessel, and of plungers working therein, as fully described hereafter, for the purpose of pressing lard or forcing sausage-meat.

In order to enable others to make and use my invention, I will now proceed to describe its construction and operation, reference being had to the accompanying drawing, which forms a part of this specification, and in which—

Figure 1 is an outside view of the apparatus, with the top thrown back.

Figure 2, a sectional view of the same, as it appears when in use for pressing lard.

Figure 3, a sectional plan view, on the line 1 2, fig. 2.

Figure 4, a sectional view of the apparatus, when arranged for stuffing sausages; and Figures 5 and 6, detached views, illustrating portions of my invention.

Similar letters refer to similar parts throughout the several views.

The cast-iron base A of the apparatus is permanently secured to a table or other support, B, and is provided with recesses, for the reception of lugs $a\ a$ of a cylindrical vessel, C, which rests upon the base. By means of these lugs and recesses, and a button, $b$, the vessel is securely fastened to the base, but so as to be readily detached therefrom.

At the bottom of the vessel C is an opening, $c$, covered by a detachable spout, D, which, in the present instance, is made in three parts, and attached to the vessel by a dove-tailed projection on its inner end, adapted to a dove-tailed recess of a block, $d$, which surrounds the opening $c$, fig. 3.

A sheet-metal casing, E, open at the bottom, and perforated at the sides by a number of small openings, $f$, is introduced into the vessel C, and suspended within the same by its flange $e$, which rests upon the upper edge of the vessel.

The lower edge and sides of the casing E are free from contact with the interior of the vessel, and to the flange on the upper end of the said casing is hinged a funnel-shaped ring, F, which can be turned to the position shown in fig. 1, so as to form a continuation or enlargement of the upper end of the casing, or it may be turned back, as indicated by dotted lines, until it rests against the outside of the vessel C.

A yoke, G, is hinged to a projection, $h$, at one side of the vessel, and may be fastened to the opposite side of the same by a catch, $g$, pivoted to the yoke, and adapted to a lug, $i$, of the vessel.

A spindle, H, passes transversely through the yoke, and has at one end an operating-handle, $j$, and at the opposite end a ratchet-wheel, $k$, to the teeth of which is adapted a pawl, $k'$, hung to the yoke, fig. 1.

The spindle is also provided with a pinion, $l$, fig. 5, which engages with the teeth of a rack at one side of a plunger-rod, X, which passes through and is guided by the yoke, the lower end of the said rod terminating in a plunger, I, which is arranged to fit snugly in the casing E.

The apparatus, when arranged as above described, is used as a lard-press, and, before charging the same, the plunger I is, by operating the handle $j$, drawn out of the casing F, and close up to the yoke, the latter being then thrown back, as shown in fig. 1, and the ring or funnel F turned to a position directly over the casing E, in order to facilitate the introduction of the fatty matter from which the lard is to be expressed.

After filling or partly filling the casing E, the funnel is then thrown back, as shown in dotted lines, fig. 1, and the yoke G is turned upon its hinge to the position shown in fig. 2, and locked by means of the catch $q$, the handle $j$ being then turned until the rod H is sufficiently lowered to cause the plunger I to bear upon the mass within the casing.

The handle is still turned, and the plunger forced downwards, the lard, as it is pressed from the solid portion of the mass, passing through the perforations $f$, and beneath the casing into the spout D, and thence to a suitable receptacle placed to receive it.

The pawl and ratchet, $k$ and $k'$, at the end of the operating-spindle, permit the latter to be turned in a direction necessary to lower the plunger, but prevent the raising of the plunger, and the consequent reversing of the motion of the spindle by any elasticity of the compressed mass.

After thoroughly extracting the lard, the plunger is raised from the casing, and, together with the yoke, thrown back, as shown in fig. 1, the solid residuum being then removed, and a fresh charge introduced, to be operated upon as before.

In preparing the apparatus to be used as a sausage-stuffer, the yoke is thrown back, and the perforated casing removed from the vessel C; after which, a supplementary plunger, K, of a diameter equal to that of the inside of the vessel, is attached to the plunger I, by means of a dove-tailed projection, $r$, adapted to a corresponding recess on the under side of the upper plunger, (see figs. 4 and 6.)

The operation of the apparatus, when used for this purpose, does not differ materially from that before described, the sausage-meat being merely forced downwards by the plunger, and through the spout D into the casings.

In order, however, (when the plunger has almost reached the limit of its downward movement,) to prevent the sausage-meat from being forced backwards from the spout into the vessel C, the plunger is provided with a curved plate or guard, $s$, at a point directly opposite the spout.

An important feature of my invention is the facility with which the several parts may be detached from each other when it is necessary to clean them. After turning the button $b$, the apparatus may be moved laterally, as indicated by the arrow, and raised from the base-plate, the spout is readily taken off, and the yoke as readily unhinged.

I claim as my invention, and desire to secure by Letters Patent—

1. The vessel C, rendered detachable from the base, A, having a detachable spout, D, and adapted for the reception of a perforated casing, E, and of plungers I or K, the whole being arranged and operating substantially as and for the purpose set forth.

2. The yoke G, hinged to the vessel C, and its spindle H and pinion $l$, for operating the plunger-rod H', as described.

3. The combination of the perforated casing E and a funnel-shaped ring, hinged to the casing, as and for the purpose set forth.

4. The plunger K, attached to the under side of the plunger I by a dove-tailed projection, $r$, or equivalent fastening, for the purpose specified.

In testimony whereof, I have signed my name to this specification in the presence of two subscribing witnesses.

JOSEPH B. CASSEL.

Witnesses:
JOHN WHITE,
WM. A. STEEL.